US011706295B2

(12) United States Patent
Rasmussen (10) Patent No.: US 11,706,295 B2
(45) Date of Patent: Jul. 18, 2023

(54) SYSTEM AND A METHOD IMPLEMENTING A DIRECTED ACYCLIC GRAPH (DAG) CONSENSUS ALGORITHM VIA A GOSSIP PROTOCOL

(71) Applicant: I25S ApS, Hillerød (DK)

(72) Inventor: Carsten Bleser Rasmussen, Hillerød (DK)

(73) Assignee: I25S ApS, Hillerod (DK)

( * ) Notice: Subject to any disclaimer, the term of this patent is extended or adjusted under 35 U.S.C. 154(b) by 0 days.

(21) Appl. No.: 17/153,227

(22) Filed: Jan. 20, 2021

(65) Prior Publication Data

US 2021/0227027 A1     Jul. 22, 2021

(30) Foreign Application Priority Data

Jan. 20, 2020   (EP) .................................. 20020031

(51) Int. Cl.
*H04L 67/1095* (2022.01)
*G06F 16/901* (2019.01)
*H04L 69/00* (2022.01)

(52) U.S. Cl.
CPC ...... *H04L 67/1095* (2013.01); *G06F 16/9024* (2019.01); *H04L 69/03* (2013.01)

(58) Field of Classification Search
CPC . H04L 67/12; H04L 67/1095; H04L 67/1097; H04L 67/2842; H04L 2209/38; H04L 69/00; H04L 69/03; H04L 69/26; H04L 41/244; H04L 9/06; H04L 9/0643; G06F 16/10; G06F 16/27; G06F 16/273; G06F 16/901; G06F 16/1834; G06F 16/9024; G06F 16/9027; G06F 3/0601; G06F 11/2056; G06F 8/10; G06F 9/54; G06F 9/542

USPC ......................................................... 709/224
See application file for complete search history.

(56) References Cited

U.S. PATENT DOCUMENTS

| | | | |
|---|---|---|---|
| 10,747,753 B2 * | 8/2020 | Baird, III | G06F 16/2379 |
| 2017/0075941 A1 * | 3/2017 | Finlow-Bates | H04L 9/3239 |
| 2017/0308548 A1 * | 10/2017 | Baird, III | G06F 16/182 |
| 2018/0173747 A1 * | 6/2018 | Baird, III | G06F 16/2365 |
| 2019/0013933 A1 * | 1/2019 | Mercuri | G06F 16/904 |

(Continued)

OTHER PUBLICATIONS

EP20020031.9, Rasmussen, May 11, 2020, Extended European Search Report, 6 pages.

*Primary Examiner* — James N Fiorillo
(74) *Attorney, Agent, or Firm* — Rumit Ranjit Kanakia (57) ABSTRACT

The invention relates to a computer-implemented method for exchanging information, through a DAG/Hashgraph consensus algorithm via a gossip protocol, the method includes making a first given node select a second given node randomly and send reference information; determining based on the reference information which node events are in front of that of the others; if the reference information implies that the events of the first given node is in front of that of the second given node, then sending a cancellation information to the first given node, preventing, in consequence, the first given node from sending DAG-event information to the second given node; if the reference information implies that the events of the second given node is in front of that of the first given node, then making the first given node send DAG-event information to the second given node; and soon through the network.

11 Claims, 4 Drawing Sheets

(56) References Cited

U.S. PATENT DOCUMENTS

| | | |
|---|---|---|
| 2019/0013934 A1 | 1/2019 | Mercuri et al. |
| 2019/0020629 A1* | 1/2019 | Baird, III .............. H04L 9/3066 |
| 2019/0347444 A1* | 11/2019 | Lowagie .............. G06F 21/602 |
| 2020/0118131 A1* | 4/2020 | Diriye .................. H04L 9/3239 |
| 2020/0126155 A1* | 4/2020 | Overholser .......... H04L 67/104 |
| 2020/0272618 A1* | 8/2020 | Hughes ................. H04L 9/3236 |
| 2020/0394183 A1* | 12/2020 | Jois ....................... H04L 9/3239 |
| 2020/0396065 A1* | 12/2020 | Gutierrez-Sheris ......................... H04L 67/104 |
| 2022/0391358 A1* | 12/2022 | Baird, III .............. G06F 16/275 |

\* cited by examiner

SYSTEM AND A METHOD IMPLEMENTING A DIRECTED ACYCLIC GRAPH (DAG) CONSENSUS ALGORITHM VIA A GOSSIP PROTOCOL

CROSS-REFERENCE TO RELATED APPLICATIONS

This application claims the benefit of European Patent application no. EP20020031.9, filed on Jan. 20, 2020.

TECHNICAL FIELD

The present invention relates to the field of exchanging information relating in particular to a list of actions or transactions, among distributed computer nodes connected in a specific network.

The invention relates to a system and a method implementing a Directed Acyclic Graph (DAG) consensus algorithm such as a Hashgraph consensus algorithm via a gossip protocol.

BACKGROUND

The Hashgraph is known in the art as a new way of reaching consensus in a decentralised network. It is often referred to as a voting algorithm. The Hashgraph is a specific Directed Acyclic Graph (DAG).

The goal of Hashgraph is primarily to reach consensus between nodes in distributes system. The Hashgraph algorithm is a way to solve Byzantine Generals' Problem.

In addition, Hashgraph algorithms may stop an attacker from shutting down the network or freezing the network, thereby stopping it from reaching consensus.

One idea with this invention is to have an efficient way to exchange information between nodes, as well as a support method and support system for the Hashgraph or other DAG systems which need to exchange DAG information.

Figure 1:
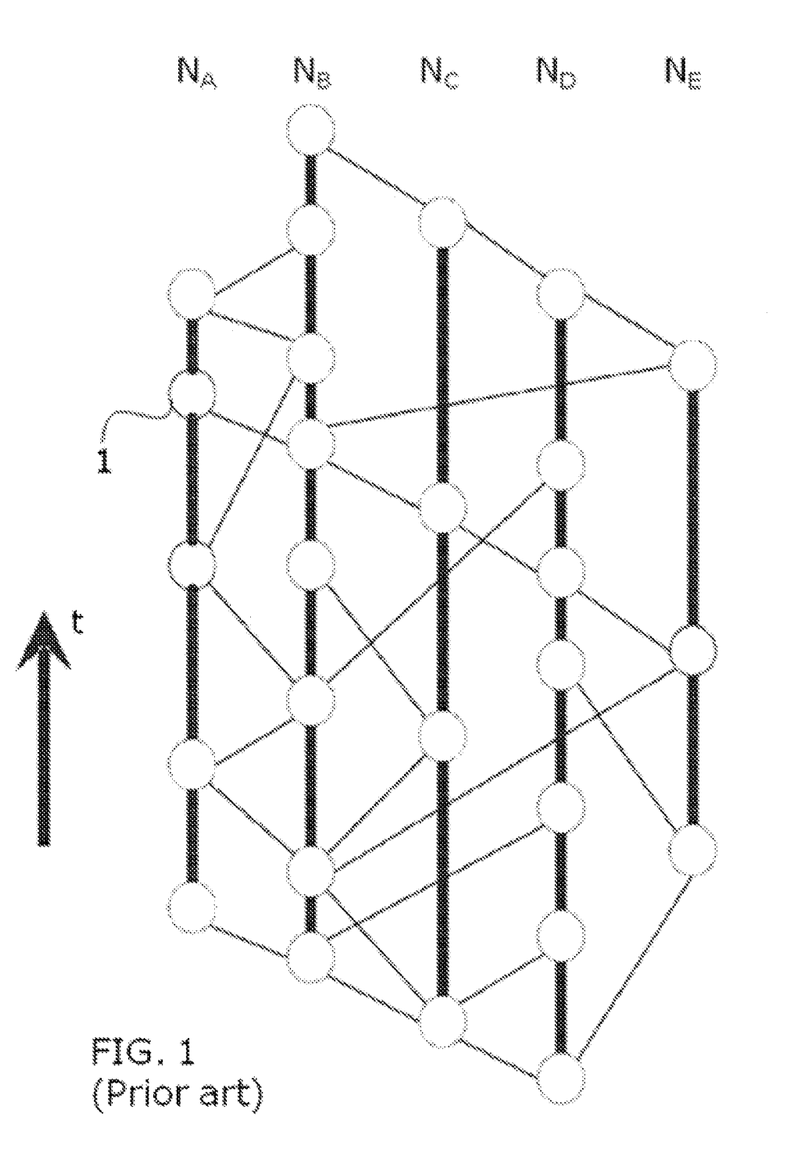
FIG. 1 is a schematic illustration of a Hashgraph in a method according to the prior art.

FIG. 1 illustrates a Hashgraph schematically as developed in the art. The Hashgraph is based on a network of computer nodes ($N_A$, $N_B$, $N_C$, $N_D$, $N_E$) arranged vertically in FIG. 1. Each computer node ($N_A$, $N_B$, $N_C$, $N_D$, $N_E$) can record what is called an event 1 represented as a circled, and more detailed in FIG. 2. The event is generally a sequence of information/bytes and memory, that is then hashed. The event will be recorded by the node. The event comprises a piece of information to be distributed to the network. The information is generally hashed to have it secured. The Hashgraph thus enables to distribute secured information that is distributed in the network.

The event is signed by the node.

In the implementation of a Hashgraph, a node will then randomly select another node and transmit him all the information it hashed about the communication. This is repeated until the information is propagated throughout the network.

The Hashgraph implies infinite numbers of transmissions of information in the network. In addition, in the Hashgraph algorithm, an event always includes a timestamp to reach a consensus timestamp in the network.

Figure 2:
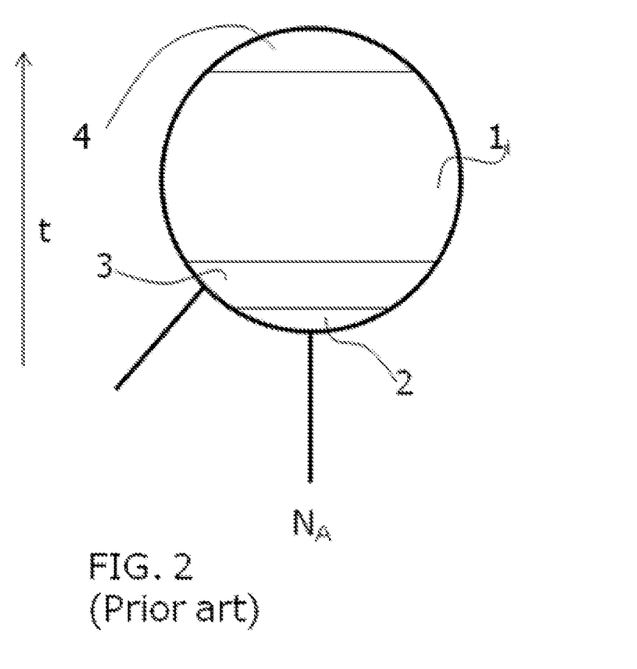
FIG. 2 is a schematic illustration of an event in the Hashgraph of FIG. 1.

Referring to FIG. 2, the information of the event includes
a hash from the self-parent 2 received from the self-parent node represented vertically in FIG. 2. The hash from the self-parent 2 relates to previous events in the memory of the self-parent node;
a hash from the "other" parent 3 received from the other parent node represented diagonally in FIG. 2. The hash from the other parent 3 relates to previous events in the memory of the other parent node;
information of the current event $1_i$; and
a timestamp 4 of the current event.

An objective of the invention is to limit/reduce the number of transmissions of information and to decrease the use of computer resources in the calculations, storing and transmission of the information.

Another general objective of the invention is to efficiently exchange information between computer nodes and to prevent nodes from going into an infinity echo where they forever send information back and forth.

Another objective is to secure the nodes and easily determine what information needs to be shared between nodes, without sending unnecessary information between them.

SUMMARY

In order to meet these objectives, the invention relates to a computer-implemented method for exchanging information among distributed computer nodes connected in a specific network, the method implementing a Directed Acyclic Graph (DAG) consensus algorithm such as a Hashgraph consensus algorithm via using a gossip about gossip protocol, the method comprising steps for
making a first given node select a second given node randomly and send reference information;
the method being preferably characterized by
determining based on the reference information which node events are in front of the others;
If the reference information implies that the events of the first given node is in front of the events of the second given node,
then sending a cancellation information to the first given node, preventing, in consequence, the first given node from sending DAG-event information to the second given node;
If the reference information implies that the events of the second given node is in front of the events of the first given node,
then making the first given node send DAG-event information to the second given node;
and preferably, then making the second given node send DAG-event information to the first given node;
. . .
and so on for other nodes, so as to synchronise and propagate the DAG-event information through the network.

More precisely, according to an aspect, the method comprises a step for
making the second given node send a cancellation information to the first given node,
when the second given node receives the reference information from the first given node,
if the second given node previously sent a reference information to the first given node,
such that the first given node does not send DAG-event information to the second given node.

The "DAG-event information" refers to the information which is exchanged relating to an event of the DAG. In particular, the pieces of information are in connection via hash pointers. It means the hash of an event is a unique hash (fingerprint), and the self-parent and the other-parent hash fingerprints are contained in the event, which acts as unique identifiers/pointers between events in the DAG.

Advantageously, the method enables to limit the number of transmissions of information via the cancellation information such that the node stops the communication of the information. That implies decreasing the use of computer resources in the calculations, storing and transmission of the information.

The idea with this invention is to have an efficient way to exchange information between nodes (gossip about gossip). So the Wavefront method is used as a support system for the Hashgraph or other DAG systems which need to exchange DAG information.

Furthermore, it limits the number of information by sending the state of each node's chain of events, which is indicated by the reference/altitude number. By this way, the node can decide if the last event in a chain of events is behind or in front of the other node event chain.

In addition, the cancellation enables to prevent infinity echo between two nodes.

In addition, the Wavefront method enables to secure the nodes easily and to determine what information needs to be shared between to nodes by sharing the "wave-front" state (further detailed below) without sending unnecessary information between them.

According to other aspects of the method taken individually or combined in any technically possible combination:
the reference information relates to the order of node events; and/or
the order of node events is determined by keeping track of an ordinate value of every event; and/or
the order of node events is determined by making each node keep track of an integer value called Altitude, which increases for each event created in a node; and/or
the reference information is sent via a Tidal-wave; and/or
the cancellation information is sent via a Breaking-wave; and/or
the second sending of DAG-event information from the second given node to the first given node is the second and last wave of DAG-event information; and/or
the method comprises a step for sending another cancellation information if a node receives information that is not in a predetermined sequence of exchange of information and/or if a node receives information from a node with which it already exchanged information.

The invention further relates to a system for exchanging information, comprising means for carrying out the steps of the method according to the invention.

More generally, the invention further relates to a system for exchanging information among distributed computer nodes connected in a specific network, the system implementing a Directed Acyclic Graph consensus algorithm such as a Hashgraph consensus algorithm via using a gossip about gossip protocol, the system comprising
means for making a first given node select a second given node randomly and send reference information;
the system being preferably characterized by
means for determining based on the reference information which node events are in front of the others;
means for sending a cancellation information to the first given node if the reference information implies that the events of the first given node are in front of that of the second given node,
preventing, in consequence, the first given node from sending DAG-event information to the second given node; and
means for making the first given node send DAG-event information to the second given node if the reference information implies that the events of the second given node are in front of the events of the first given node,
and preferably, means for making then the second given node send DAG-event information to the first given node;

. . .

and so on for other nodes, so as to synchronise and propagate the DAG-event information through the network.

The advantages mentioned above for the method also apply to the system implementing the method.

According to other aspects of the system taken individually or combined in any technically possible combination:
the reference information relates to the order of node events; and/or
the system comprises means for keeping track of an ordinate value of every event to determine the order of node events; and/or
the system comprises means for making each node keep track of an integer value called Altitude, which increases for each event created in a node to determine the order of node events; and/or
the system comprises means for sending wherein the reference information via a Tidal-wave, and means for sending the cancellation information via a Breaking-wave; and/or
the system comprises means for limiting the number of transmissions of DAG-event information between the first given node and the second given node; and/or
the system comprises means for sending another cancellation information if a node receives information that is not in a predetermined sequence of exchange of information.

Another object of the invention is a network comprising one or more central unit, in particular, one or more computerised central unit, and connection(s) to additional command units implementing transactions, in particular, computerised command units, the central unit(s) comprising a system according to the invention.

BRIEF DESCRIPTION OF THE DRAWINGS

The invention will now be presented in details via the description of non-limitative embodiments of the invention and based on the enclosed drawings, among which.

DETAILED DESCRIPTION

The invention relates to exchanging information.

The invention includes implementing a DAG consensus algorithm via a gossip about gossip protocol, such as a Hashgraph consensus algorithm via a gossip about gossip protocol.

Figure 3:
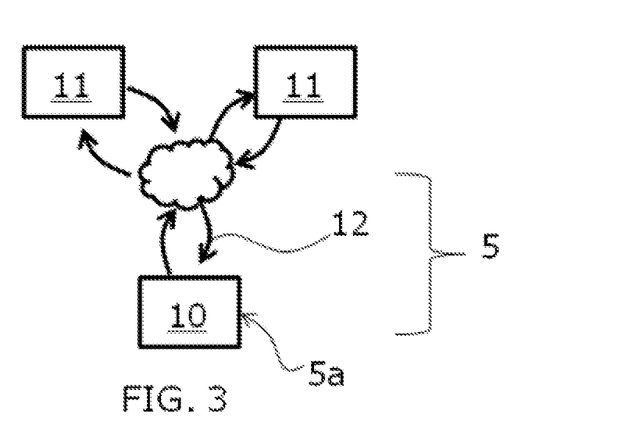
FIG. 3 is a schematic illustration of a system according to an embodiment of the invention.

The means of the invention distribute the information via a gossip protocol, sending information about the data received from the other nodes in a specific network 5.

The invention concerns a computer-implemented method, and also the corresponding system 5a and network 5. The method of the invention enables to process and exchange information, such as what is needed regarding blockchain transaction and applications of Hashgraphs.

The DAG, such as a Hashgraph, is used to exchange information among distributed computer nodes connected in a specific network. The information is secured and hashed. The information of the DAG/Hashgraph transmitted will be called the "DAG-event information".

A gossip protocol implies that computer nodes transmit to one another, the information that they have in memory.

The method of the invention comprises a step for determining an order of node events to determine node events that are in front and node events that are behind.

In the embodiment, the order front and behind is not based on time. This embodiment does not need time consensus. Advantageously, this avoids the problem of having echo computer node to agree on the same time.

Determining the order of events enable to know which event is in front, and which event is behind. Thus the information on the event is more precise. This determination is preferably not limited to having a timestamp of the node in the event.

According to an embodiment of the invention, the order of node events is determined by keeping track of an ordinate value of every event. Advantageously, using an ordinate value avoids the problem of having echo computer nodes to agree on the same time.

In particular, the order of node events is determined by making each node keep track of an integer value called Altitude, which increases for each event created in a node. The altitudes play a role in the processing of the information.

In another step of the method of the invention, a first given node $N_1$ randomly selects a second given node $N_4$ and may send it DAG-event information 6, 7 in network 5. More generally, the system is made such as making the first node $N_1$ selecting a second given node $N_4$ randomly and if applicable, sending DAG-event information (6, 7).

All the nodes $N_0$, $N_1$, . . . , $N_5$, . . . of the network 5 proceed so until the DAG-event information (6, 7) is propagated in the network 5.

The invention aims at preventing some transmissions of DAG-event information and yet having the relevant information propagated in the network 5.

According to the invention, the method comprises a step for, when the first given node $N_1$ randomly selects the second given node $N_4$, making the first given node $N_1$ send the second given node $N_4$ a specific reference information (8) before sending any DAG-event information (6, 7). The sending of the reference information may be called a Tidal-wave. The Tidal-wave is a flow of information.

The "Tidal-wave" may define an altitude value for each node. Each node keeps track of the event-DAG; this means that each node has the current altitude known by the node for each node.

In particular, the reference information (8) relates to the order of node events. More particularly, the reference information 8 comprises the previous altitudes, here, a list of all Altitudes for each node.

Furthermore, according to the invention, the method comprises a step for sending a cancellation information (9) to the first given node $N_1$ under certain conditions to avoid further transmission of DAG-event information 6, 7 from the fist given node $N_1$ to the second given nodes $N_4$. The sending of the cancellation information 9 may be called a Breaking-wave. The Breaking-wave is a flow of information sent as a response, in order for the node to return to the initial state.

Cancellation information 9 is sent when the second given node $N_4$ receives the reference information 8 from the first given node $N_1$ if in view of the reference information 8, the events of the second given node $N_4$ are not in front of that of the first given node $N_1$. This is easily done when analysing the altitudes.

Cancellation information 9 may go directly from the second node $N_4$ to the first node $N_1$ in the preferred embodiment.

The method further comprises a step for, in consequence of the cancellation information, preventing the first given node $N_1$ from sending DAG-event information to the second given node $N_4$.

In other words: the second given node $N_4$ sends a cancellation information to the first given node $N_1$, such that the first given node $N_1$ does not send DAG-event information to the second given node $N_4$.

Advantageously, the method enables to limit the number of transactions via the cancellation information such that the node stops the communication of the information. This implies decreasing the use of computer resources in the calculations, storing and transmission of the information.

If, in view of the reference information (8), the events of the second given node $N_4$ is in front of that of the first given node $N_1$, then the transmission of DAG-event information continues.

In particular, the second given node $N_4$ sends the DAG-event information, including the events it has in memory to the first given node $N_1$. This first sending of DAG-event information may be called a First-wave 6. The First-wave is a flow of information known as such by the skilled person in the art. The DAG-event information of the First-wave 6 includes a list of all the events the second given nodes $N_4$ has in memory.

Moreover, in particular, after the first given node $N_1$ receives the DAG-event information from the second given node $N_4$, the first given node $N_1$ may send the DAG-event information, including the events it has in memory to the second given node $N_4$. This second sending of DAG-event information may be called a Second-wave (7). The Second-wave is a flow of information known as such by the skilled person in the art.

After the first and second waves, the exchanges of information between the first given node $N_1$ the second given node $N_4$ are stopped.

This is a second way of avoiding the infinite echo of information transmitted. In other words, when the second-wave is received/send the wave state for this node-id is returned to the initial state.

According to a preferred embodiment, the method includes a step of sending another (second) cancellation information if a node receives information that is not in a predetermined sequence of exchange of information, in particular the sequence of first the reference information (8), then the first wave (6) and then the second wave (7) of the DAG-event information. The cancellation information is in particular of the same type as previously, but is triggered if for example the second given node $N_4$ receives at first, a second wave.

According to another embodiment, the method includes a step of sending another (third) cancellation information if a node receives information from a node with which it already exchanged information. The cancellation information is in particular of the same type as previously, but is triggered if for example the second given node $N_4$ receives later another reference information 8 from the first Node $N_1$. Advantageously, these steps limit further the redundancy/echo regarding the transmission of information.

The invention further concerns a system 5a for implementing the method as described above. The system 5a is a computerised system and comprises inherent hardware and software modules configured to implement the method described above. It may be called a Wavefront system 5a.

The system 5a enables to exchange information among distributed computer nodes connected in a specific network, implementing a DAG/Hashgraph consensus algorithm via a gossip about gossip protocol.

The system 5a comprises means for determining an order of node events to determine node events that are in front and node events that are behind;

means for making a first given node $N_1$ select a second given node $N_4$ randomly and sending a reference information (8) and, where applicable, DAG-event information (6, 7),

. . .

means for propagating the DAG-event information (6, 7) in the network 5.

According to one aspect, the system 5a comprises means for making the second given node $N_4$ send a cancellation information to the first given node $N_1$, when the second given node $N_1$ receives the reference information from the first given node $N_1$, if the second given node $N_4$ previously sent the reference information to the first given node $N_1$, means for preventing, in consequence, the first given node $N_1$ from sending DAG-event information to the second given node $N_4$.

The system 5a further preferably comprises means for sending another cancellation information if a node receives information that is not in a predetermined sequence of exchange of information; and/or if a node receives information from a node with which it already exchanged information.

The advantages mentioned above for the method also apply to the system implementing the method.

Another object of the invention is a network comprising one or more central unit(s) 10, in particular, one or more computerised central unit, and connection(s) 12 to additional command units 11 implementing transactions, in particular, computerised command units, the central unit(s) comprising a system 5a as described above. This may be called a Wavefront network. The network may be connected via the internet to the additional command units.

The advantages mentioned above for the method and the system 5a also apply to the network 5 including the corresponding system 5a.

Example

Figure 4:
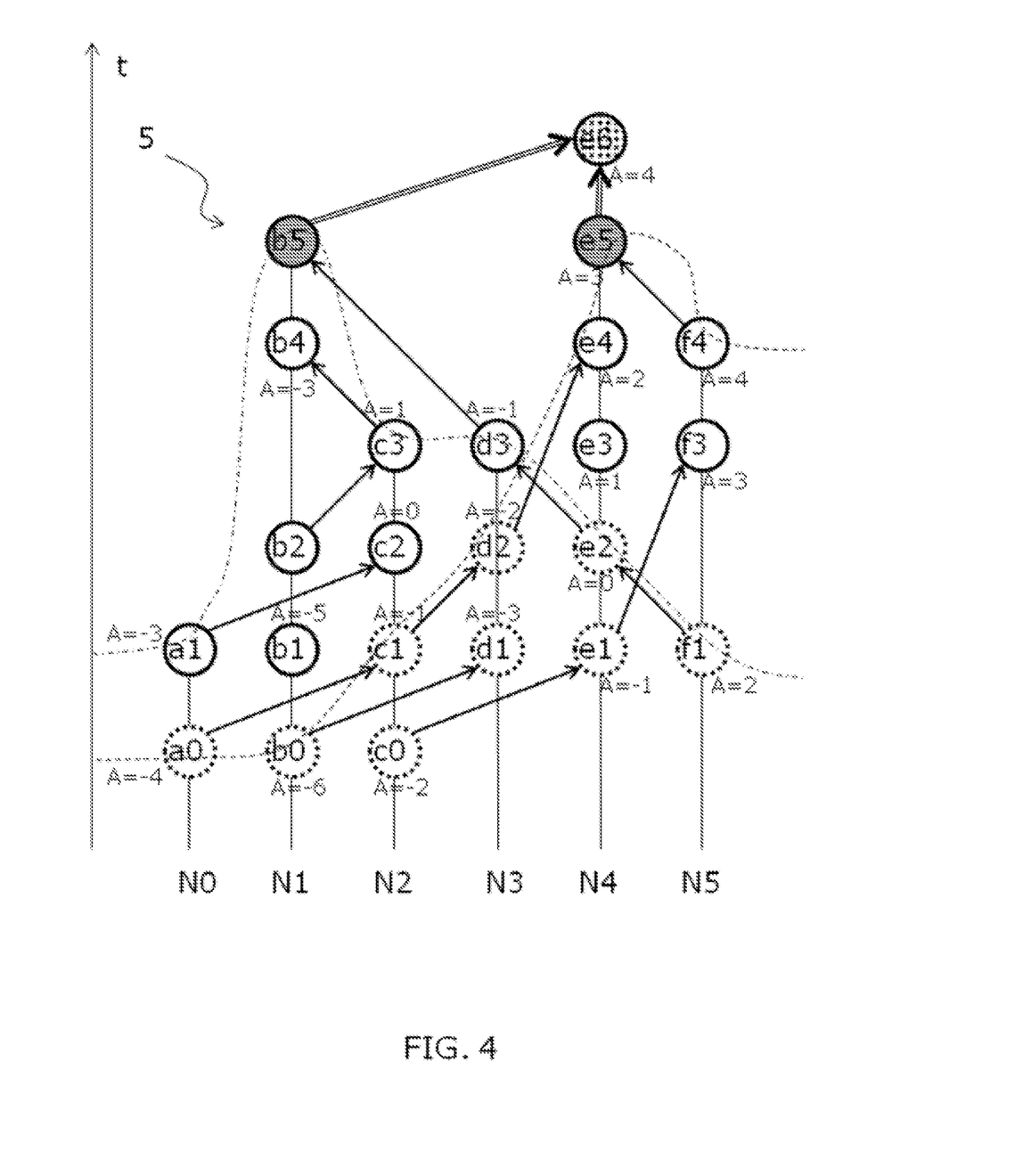
FIG. 4 is a schematic illustration of a Hashgraph in a method according to an embodiment of the invention.
Figure 5:
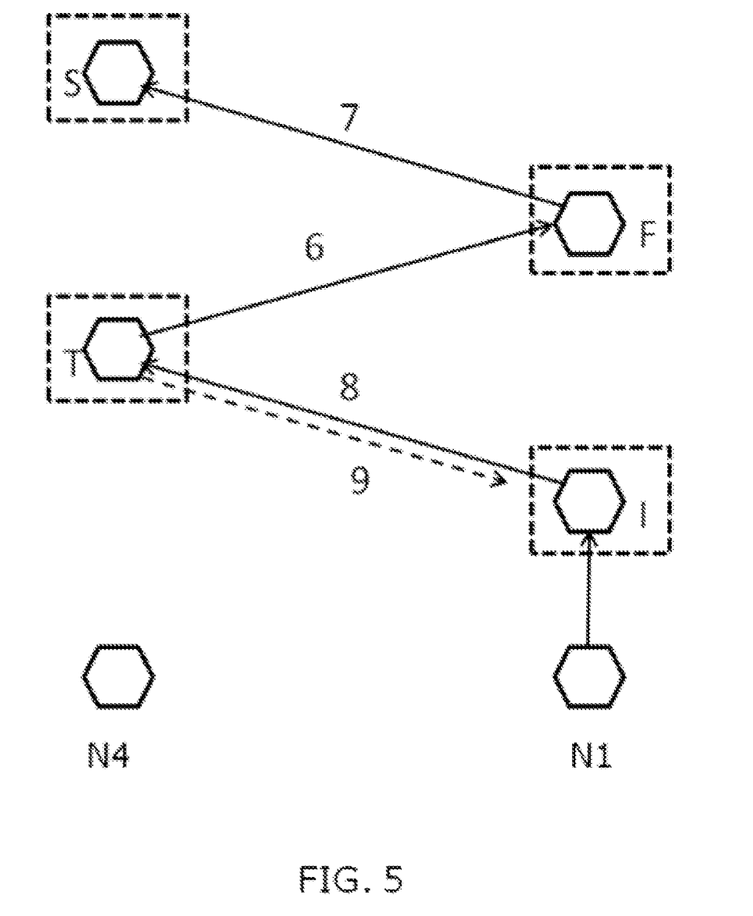
FIG. 5 is a detailed illustration of exchanges of information between two nodes in the invention.

An example is described in detail in FIGS. 4 and 5.

FIG. 4 shows a Hashgraph of gossip information representing the information flow between network nodes $N_D$, $N_1$, $N_2$, . . . , $N_5$. Other nodes are preferably in the same network but are not represented.

In finite time all nodes in the network will be able to build the same event-DAG.

Each vertical line represents a compute node and each circle an event. The lines between the events represent the communication of the events between the nodes.

The events only seen by the respective Nodes are in white circles with unbroken lines. The events seen by two or more Nodes are in white circles with broken lines. The lasts events of the respective Node are in plain coloured circles.

The last event to create is a dotted circle.

The Hashgraph algorithm uses a gossip protocol called "gossip about gossip" to propagate information between the nodes. This means a first given node $N_1$ sends all the information of the communication that it knows to a randomly selected second given node $N_4$. This enables node $N_4$ to construct the same Hashgraph as node $N_1$.

In the network of the invention 5, a protocol called Wavefront is used to exchange information between two nodes, ensuring that node $N_1$ and $N_4$ only needs to communicate three times to exchange the state of the graph.

Each node keeps track of an integer value called Altitude. Altitude is increased by one for each event created by the node. Each node stores its current view of Altitude for each node in the network.

By exchanging information about the Altitude between two nodes, both are able to figure out which of the events are in front.

To determine which event is in the current event and the received event is subtracted this value is greater than 0 it means that the current event is in front of the received event and vice versa.

$$a_{current} - a_{received} < 0$$

if the received event is in front of the current event.

The Wavefront information exchange has four states:

1. Node $N_1$ randomly selects Node $N_4$ and sends a list of last known Altitudes for each node. This state is called a Tidal-wave.

2. Node $N_4$ receives a Tidal-wave from Node $N_1$. If based on the Tidal wave, the events of Node $N_4$ are not in front of the events of Node $N_1$ then Node $N_4$ will send which is called a Breaking-wave to Node $N_1$. Otherwise, Node $N_4$ will return a list of all events which are in front of the Tidal-wave of Node $N_1$. This state is called first-wave.

3. If Node $N_1$ receives a First-wave from Node $N_4$, it returns a list of all the events which are in front of Node $N_4$. When this state has been reached the wave-front exchange ends.

4. If Node $N_1$ or Node $N_4$ receives a Breaking-wave, the wave-front communication is dropped.

Regarding state 2, alternatively or in combination, if Node $N_4$ already exchanged information with node $N_1$ through a previous Tidal wave, then Node $N_4$ would send a Breaking wave. In addition, alternatively or in combination, if Node $N_4$ received at first a second wave from node $N_1$, then Node $N_4$ would send a breaking wave.

This prevents both nodes from going into an infinity echo where they forever send information back and forth.

In the network, a node will often have many simultaneous wave-front connections, so it will sometimes receive the same event package from other nodes. It will simply drop any duplicated events it receives.

The examples in FIGS. 4 and 5 illustrate events and altitude values are shown.

Node 1 synchronizes to Node $N_4$. The event b5 (coloured) is the last event generated by Node $N_1$ and all the previous events which are known by b5 are under the dotted dash line.

The event e5 (coloured) is the last event generated by Node $N_4$ and all previous events know by this event is under the dashed line.

All the events know by both b5 and e5 is drawn as dashed circles.

The Wavefront from Node $N_1$ (marked with the dotted dash line) is the list of all altitudes of the latest known events.

This means the Wavefront Node $N_1$ is.

$$W_{1,b5}=[-3,-2,1,-1,0,2]$$

The same for Node $N_4$ marked with blue dashed-line $$W_{4,e5}=[-4,-6,-1,-2,3,4]$$

The steps of communication are as follows:

The first node $N_1$ is first in an idle state at the bottom of the figure. The first node $N_1$ initiates a gossip towards the second node $N_4$ and goes to an initial state I.

1. Initial Wavefront:

Node $N_1$ connects to Node $N_4$ and sends the Wavefront $W_{1,b5}$ to Node $N_4$.

This message is marked as a Tidal-wave type. This makes Node 4 go from an idle state to a Tidal-wave state T.

2. If a Message Marked as Tidal-Wave Type is Received:

Node $N_4$ receives the Wavefront and compares with its Wavefront $W_{4,e5}$ and collects all the events which are in front of the $W_{1,b5}$ this means the events e3, e4, e5, f3 and f4 are returned to Node $N_1$.

This message is marked as a first-wave type. It makes Node $N_1$ go to a First-wave state F.

3. If a Message Marked First-Wave are Received:

Node $N_1$ receives the Wavefront from Node $N_4$ and stores the events which are unknown by Node $N_1$.

The received Wavefront is compared to its Wavefront and the events in front of the received Wavefront are collected and returned to Node $N_1$.

The collected in this example is a1, b1, b2, b4, b5, c2, c3 and d3.

This message is marked as a second-wave type. It makes Node $N_4$ go to a Second-wave state S.

If the Node $N_4$ already has sent and a message of the First-wave to Node $N_1$, Node $N_4$ will send a message marked as a Breaking-wave type to Node 1 and it must set the state for the communication to Node $N_1$ to none.

4. If a Message Marked Second-Wave is Received:

The events are stored if the events are unknown to Node $N_4$.

5. If a Message Marked Breaking-Wave are Received:

This communication state of the received channel is set to none.

The communication flow of the example is shown in FIG. 5.

In this example, the Tidal-wave 8 includes the list of altitudes $W_{1,b5}=[-3,-2,1,-10,2]$.

The First-wave 6 includes the list of altitudes $W_{4,e5}=[-4,-6,-1,-2,3,4]$, and also the list of events 1: {e3, e4, e5, f3, f4}.

The Second-wave 7 includes the list of events 1: {a1, b1, b2, b4, b5, c2, c3, d3}.

What is claimed is:

1. A computer-implemented method comprising instructions stored on a non-transitory computer readable storage medium and executed on a computing system provided with a hardware processor and memory for exchanging information among distributed computer nodes connected in a specific network, by implementing a Directed Acyclic Graph consensus algorithm, which is a Hash graph consensus algorithm via a gossip protocol, the method comprising steps of:

making a first given node select a second given node randomly and send reference information;

wherein the second given node determines which node events are in front of the events of the first given node based on the reference information; and wherein a cancellation information is sent to the first given node, when the events of the first given node are in front of the events of the second given node, thereby preventing the first given node from sending DAG-event information to the second given node; and wherein the first given node is configured to send DAG-event information) to the second given node, and then the second given node is configured to send DAG-event information to the first given node, and so on for other nodes, so as to synchronize and propagate the DAG event information through the network, when the events of the second given node is in front of the events of the first given node;

wherein the first given node is configured to find the events which are in front of the events known by the second given node from the list of events received from the second given node; and collect this list of those events and send information back to the second given node and so on for other nodes, so as to synchronize and propagate the events information through the network;

wherein the number of transactions between the nodes is limited via the cancellation information such that the node stops the communication of the information, thereby decreasing the use of computer resources in the calculations, storing and transmission of the information;

wherein the reference information comprises a list of altitude values for each node, and wherein the reference information relates to the order of node events, and wherein the order of node events is determined by keeping track of an ordinate value of every event, and wherein the order of events are not based on time and do not need time consensus.

2. The computer-implemented method according to claim 1, wherein the order of node events is determined by making each node keep track of an integer value called Altitude, which increases for each event created in a node.

3. The computer-implemented method according to claim 1, wherein the reference information is sent via a Tidal-wave, and/or the cancellation information is sent via a Breaking-wave.

4. The computer-implemented method according to claim 1, characterized in that the second sending of DAG-event information from the second given node to the first given node is the second and last wave of DAG-event information.

5. The computer-implemented method according to claim 1, comprising a step for sending another cancellation information if a node receives information that is not in a predetermined sequence of exchange of information and/or if a node receives information from a node with which it already exchanged information.

6. A system for exchanging information among distributed computer nodes connected in a specific network, through a Directed Acyclic Graph consensus algorithm which is a Hash graph consensus algorithm via gossip protocol, the system comprising:

means for making a first given node select a second given node randomly and send reference information;

the system being preferably characterized by:

means for determining based on the reference information which node events are in front of the others;

means for sending a cancellation information to the first given node, when the reference information implies that the events of the first given node are in front of the events of the second given node, thereby preventing, in consequence, the first given node from sending DAG-event information to the second given node; and means for making the first given node send DAG-event information to the second given node, when the reference information implies that the events of the second given node are in front of the events of the first given node, and means for making then the second given node send DAG-event information to the first given node and so on for other nodes, so as to synchronize and propagate the DAG event information through the network;

wherein the first given node is configured to find the events which are in front of the events known by the second given node from the list of events received from the second given node, and collect this list of those events and send information back to the second given node and so on for other nodes, so as to synchronize and propagate the events information through the network;

wherein the number of transactions between the nodes is limited via the cancellation information such that the node stops the communication of the information, thereby decreasing the use of computer resources in the calculations, storing and transmission of the information;

wherein the reference information comprises a list of altitude values for each node, and wherein the reference information relates to the order of node events, and wherein the order of node events is determined by keeping track of an ordinate value of every event, and wherein the order of events are not based on time and do not need time consensus.

7. The system according to claim 6, comprising means for making each node keeps track of an integer value called Altitude, which increases for each event created in a node to determine the order of node events.

8. The system according to claim 6, comprising means for sending wherein the reference information via a Tidal-wave, and means for sending the cancellation information via a Breaking-wave.

9. The system according to claim 6, characterized by means for limiting the number of transmissions of DAG-event information between the first given node and the second given node.

10. The system according to claim 6, comprising means for sending another cancellation information if a node receives information that is not in a predetermined sequence of exchange of information; and/or if a node receives information from a node with which it already exchanged information.

11. A network comprising one or more central unit, in particular, one or more computerized central unit, and connection(s) to additional command units implementing transactions, in particular, computerized command units, the central unit(s) comprising a system for exchanging information among distributed computer nodes connected in a specific network, by implementing a Directed Acyclic Graph consensus algorithm which is a Hash graph consensus algorithm via gossip protocol, the system comprising:

means for making a first given node select a second given node randomly and send reference information;

the system being preferably characterized by:

means for determining based on the reference information which node events are in front of the others;

means for sending a cancellation information to the first given node when the reference information implies that the events of the first given node are in front of the events of the second given node, thereby preventing, in consequence, the first given node from sending DAG-event information to the second given node; and means for making the first given node send DAG-event information to the second given node when the reference information implies that the events of the second given node are in front of the events of the first given node, and preferably, means for making then the second given node send DAG-event information to the first given node, and so on for other nodes, so as to synchronize and propagate the DAG event information through the network;

wherein the first given node is configured to find the events which are in front of the events known by the second given node from the list of events received from the second given node, and collect this list of those events and send information back to the second given node and so on for other nodes, so as to synchronize and propagate the events information through the network;

wherein the reference information comprises a list of altitude values for each node, and wherein the number of transactions between the nodes is limited via the cancellation information such that the node stops the communication of the information, thereby decreasing the use of computer resources in the calculations, storing and transmission of the information;

wherein the reference information relates to the order of node events, and wherein the order of node events is determined by keeping track of an ordinate value of every event, and wherein the order of events are not based on time and do not need time consensus.

* * * * *